United States Patent
Nagano (10) Patent No.: US 10,052,757 B2
(45) Date of Patent: Aug. 21, 2018

(54) ROBOT CONTROL DEVICE AND ROBOT CONTROL METHOD

(71) Applicant: Mitsubishi Electric Corporation, Tokyo (JP)

(72) Inventor: Takashi Nagano, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 139 days.

(21) Appl. No.: 15/304,198

(22) PCT Filed: Apr. 24, 2014

(86) PCT No.: PCT/JP2014/061572
§ 371 (c)(1),
(2) Date: Oct. 14, 2016

(87) PCT Pub. No.: WO2015/162757
PCT Pub. Date: Oct. 29, 2015

(65) Prior Publication Data
US 2017/0028548 A1 Feb. 2, 2017

(51) Int. Cl.
*G06F 19/00* (2018.01)
*B25J 9/10* (2006.01)
*B25J 9/16* (2006.01)

(52) U.S. Cl.
CPC .............. *B25J 9/10* (2013.01); *B25J 9/1643* (2013.01); *G05B 2219/40333* (2013.01)

(58) Field of Classification Search
CPC .. B25J 9/10; B25J 9/1643; G05B 2219/40333
See application file for complete search history.

(56) References Cited

U.S. PATENT DOCUMENTS

| 2013/0338827 A1* | 12/2013 | One | B25J 9/10 |
| | | | 700/252 |
| 2017/0028548 A1* | 2/2017 | Nagano | B25J 9/10 |

FOREIGN PATENT DOCUMENTS

| JP | 11-245184 A | 9/1999 |
| JP | 2006-227724 A | 8/2006 |
| JP | 2007-4548 A | 1/2007 |
| JP | 2010-269421 A | 12/2010 |
| JP | 2011-036956 A | 2/2011 |
| JP | 5283541 B2 | 9/2013 |

OTHER PUBLICATIONS

International Search Report of PCT/JP2014/061572 dated Jun. 3, 2014 [PCT/ISA/210].

* cited by examiner

*Primary Examiner* — Ian Jen
(74) *Attorney, Agent, or Firm* — Sughrue Mion, PLLC; Richard C. Turner (57) ABSTRACT

A robot control device drives a J1 shaft, which is a turning shaft for turning a structure at an installation bed, to an angle at a target position of the J1 shaft and drives a J4 shaft for turning a structure such that the central axes of a J2 shaft, a J3 shaft, and a J5 shaft, which are bending/stretching shafts for bending or stretching the structure, are parallel to one another; then, drives the J2 shaft, the J3 shaft, and the J5 shaft to angles J2e, J3e, and J5e at target positions of the respective shafts without driving the J4 shaft; and drives the J4 shaft not reaching an angle at a target position to an angle J4e at the target position.

4 Claims, 5 Drawing Sheets

ROBOT CONTROL DEVICE AND ROBOT CONTROL METHOD

CROSS REFERENCE TO RELATED APPLICATIONS

This application is a National Stage of International Application No. PCT/JP2014/061572 filed Apr. 24, 2014, the contents of which are incorporated herein by reference in its entirety.

FIELD

The present invention relates to a robot control device and a robot control method that control a robot.

BACKGROUND

Hitherto, robots with arms have been used in the FA field. The arm has a configuration in which a plurality of shafts driven by servo motors are linearly connected to one another by a plurality of arm members. A hand mechanism (hereinafter, simply referred to as a hand), which is connected to a tool for gripping or machining a workpiece, is connected to the end of the arm.

Sometimes, some of the shafts constituting the robot need to suddenly accelerate and decelerate as the track of the robot moves closer to a singular point (for example, see Patent Literature 1 and Patent Literature 2).

CITATION LIST

Patent Literature

Patent Literature 1: Japanese Patent Application Laid-Open No. 2007-4548
Patent Literature 2: Japanese Patent Application Laid-Open No. 2006-227724

SUMMARY

Technical Problem

With the robot, when the hand moving track is close to a singular point, the posture of the arm is changed quickly to many orientations in order to control the position and the orientation of the hand and hence the movement becomes large. For this reason, there has been a desire to reduce the movement of the robot as much as possible. For example, the movement of the robot is reduced when a moving joint angle is reduced.

The present invention is achieved in view of the above-described circumstances and an object of the invention is to provide a robot control device and a robot control method capable of realizing a reduction in the movement of a robot as much as possible.

Solution to Problem

In order to solve the above problems and achieve the object, an aspect of the present invention is a robot control device that controls a robot including a plurality of shafts including two or more first shafts turning connected structures and two or more second shafts bending or stretching connected structures, a J1 shaft provided closest to an installation bed among the plurality of shafts corresponding to the first shaft, including: a processing unit that acquires a target position of a control point of the robot and thereafter performs: a first control of driving the J1 shaft to an angle of the connected structures at the target position of the J1 shaft; a second control of driving at least one of the first shafts among shafts excluding the J1 shaft from the plurality of shafts such that central axes of all of the second shafts among the plurality of shafts are parallel to one another; a third control of driving all of the second shafts among the plurality of shafts to an angle of the target position of the second shafts without driving the first shafts driven by the second control after the first control and the second control are performed; and a fourth control of driving a shaft not reaching the angle of the connected structures at the target position among the plurality of shafts to the angle of the connected structures at the target position after the third control is performed.

Advantageous Effects of Invention

The robot control device according to the invention can control the robot such that the arm members do not deviate from a straight line during the third control in which the movement of the robot becomes the largest even when the control is performed in the vicinity of the singular point; therefore, the movement of the robot can be reduced.

DESCRIPTION OF EMBODIMENTS

Hereinafter, a robot control device and a robot control method according to an embodiment of the invention will be described in detail with reference to the drawings. Further, the invention is not limited to the embodiment.

Embodiment

Figure 1:
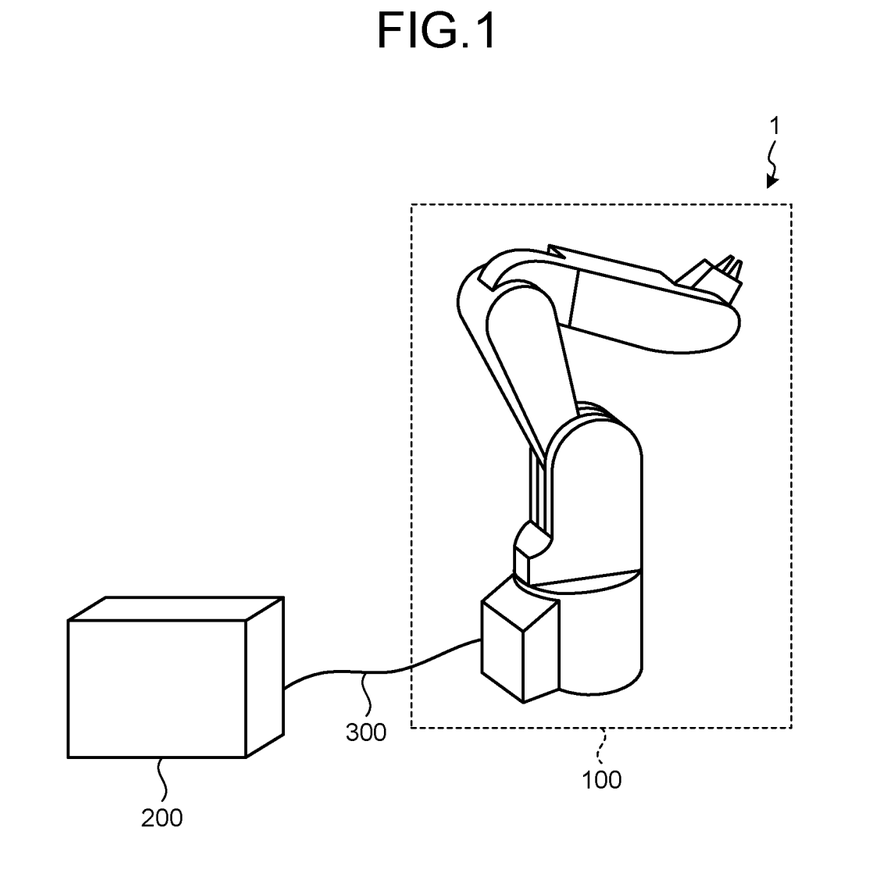
FIG. 1 is a diagram illustrating a manufacturing system that employs a robot control device according to an embodiment.

FIG. 1 is a diagram illustrating a manufacturing system that employs a robot control device of an embodiment. A manufacturing system 1 has a configuration in which a robot 100 and a robot control device 200 of the embodiment are connected to each other via a transmission path 300.

Figure 2:
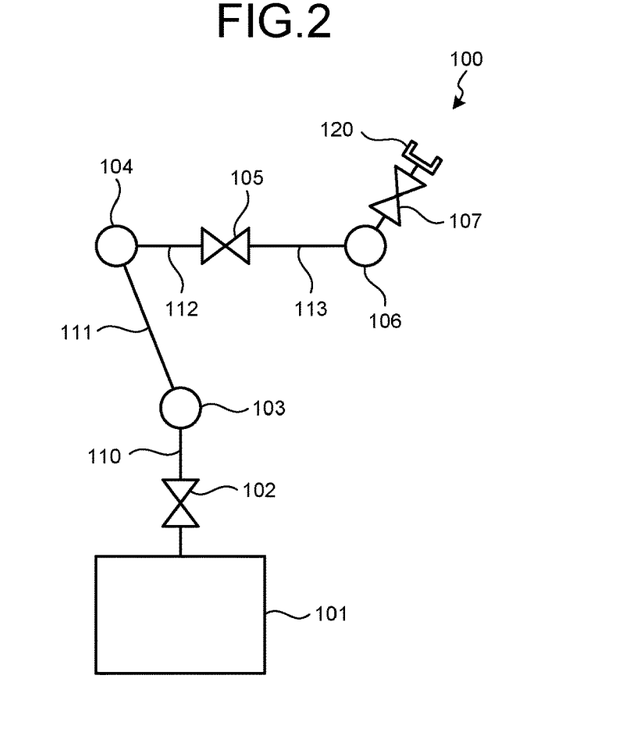
FIG. 2 is a diagram illustrating a configuration of a robot.

It is assumed, as an example, that the robot 100 is a 6-axis vertical articulated robot. FIG. 2 is a diagram illustrating a configuration of the robot 100. The robot 100 includes an installation bed 101, a J1 shaft 102, a J2 shaft 103, a J3 shaft 104, a J4 shaft 105, a J5 shaft 106, a J6 shaft 107, an arm member 110, an arm member 111, an arm member 112, an arm member 113, and a hand 120. The J1 shaft 102, the J2 shaft 103, the J3 shaft 104, the J4 shaft 105, the J5 shaft 106, and the J6 shaft 107 are sequentially connected to one another by the arm members in the order they appear in this sentence from the installation bed 101 to the hand 120.

Specifically, the J1 shaft 102 connects the installation bed 101 to the arm member 110. The J2 shaft 103 connects the arm member 110 to the arm member 111. The J3 shaft 104 connects the arm member 111 to the arm member 112. The J4 shaft 105 connects the arm member 112 to the arm member 113. The J5 shaft 106 connects the arm member 113 to the J6 shaft 107. The J6 shaft 107 connects the J5 shaft 106 to the hand 120. The J1 shaft 102, the J4 shaft 105, and the J6 shaft 107 are turning shafts, and the J2 shaft 103, the J3 shaft 104, and the J5 shaft 106 are bending/stretching shafts. Here, the turning shaft indicates a shaft that turns a structure (i.e., the installation bed 101, the arm member, the shaft, or the hand 120) connected to the shaft. The turning operation indicates the operation of turning the structure connected to the shaft about the shaft. The bending/stretching shaft indicates a shaft about which a structure connected to the shaft bends and stretches.

Further, the direction of the central axis of the J1 shaft 102 is orthogonal to the direction of the central axis of the J2 shaft 103. The central axis of the J2 shaft 103 is parallel to the central axis of the J3 shaft 104. The direction of the central axis of the J3 shaft 104 is orthogonal to the direction of the central axis of the J4 shaft 105. The direction of the central axis of the J4 shaft 105 is orthogonal to the direction of the central axis of the J5 shaft 106. The direction of the central axis of the J5 shaft 106 is orthogonal to the direction of the central axis of the J6 shaft 107.

Further, the robot 100 includes servo systems (not illustrated) that each include a servo motor and a servo amplifier and that are provided for the J1 shaft 102, the J2 shaft 103, the J3 shaft 104, the J4 shaft 105, the J5 shaft 106, and the J6 shaft 107, respectively. Each servo system drives a corresponding shaft on the basis of a driving instruction.

Further, a control point is provided at the end of the robot 100. The control point indicates a point at which the position and orientation are controlled by a user program (a robot program 207 to be described later). Here, the control point is the hand 120, but the control point may be a workpiece or a tool held by the hand 120.

The robot control device 200 supplies a driving instruction to each servo amplifier. The driving instruction is, for example, an angle instruction indicating the target angle of a corresponding shaft, an angular velocity instruction indicating the target angular velocity of a corresponding shaft, a position instruction indicating the motor position, or a speed instruction indicating the motor speed. Further, the servo amplifier of each servo system may be provided in the robot control device 200 instead of the robot 100 so that each servo amplifier supplies a driving current to the servo motor via the transmission path 300.

Figure 3:
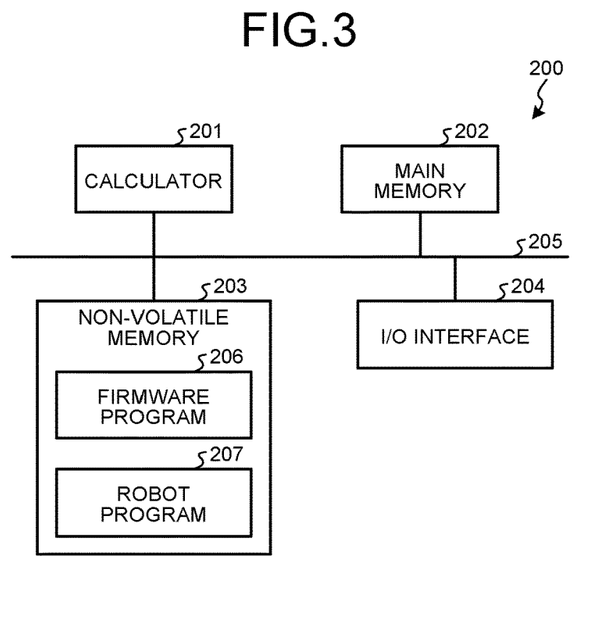
FIG. 3 is a diagram illustrating an example configuration of the robot control device.

FIG. 3 is a diagram illustrating a configuration example of the robot control device 200. The robot control device 200 includes a calculator 201, a main memory 202, a non-volatile memory 203, an I/O interface 204, and a bus 205. The bus 205 connects the calculator 201, the main memory 202, the non-volatile memory 203, and the I/O interface 204 to one another.

The calculator 201 is, for example, a CPU (Central Processing Unit). The main memory 202 is a memory that allows faster access than the non-volatile memory 203. The main memory 202 is configured as, for example, a RAM (Random Access Memory). The non-volatile memory 203 is a memory that is used as a storage area for storing various data. The non-volatile memory 203 is configured as, for example, a ROM (Read Only Memory), a flash memory, an optical disc, a magnetic disk, a removable memory device, or a combination thereof. The I/O interface 204 is an interface device that is connected to the transmission path 300.

The non-volatile memory 203 stores a firmware program 206 and the robot program 207 in advance. The robot program 207 is a user program that describes the operation sequence of the robot 100. The robot program 207 is created by the user. Further, the firmware program 206 is a system program that provides an environment for executing the robot program 207 and is created by, for example, the manufacturer of the robot 100 or the robot control device 200. In addition, the robot program 207 may be stored in a volatile memory kept by a battery.

The calculator 201 loads the firmware program 206 from the non-volatile memory 203 to the main memory 202. Then, the calculator 201 serves as a processing unit that executes the robot program 207 on the basis of the firmware program 206 loaded on the main memory 202. The calculator 201 as the processing unit analyzes the robot program 207 and calculates a driving instruction for each servo amplifier on the basis of the analysis result of the robot program 207. The calculated driving instruction is transmitted to the robot 100 via the I/O interface 204.

Further, the calculator 201 as the processing unit may calculate a driving instruction on the basis of an encoder value transmitted from each servo system. The encoder value corresponds to, for example, an angle detection value, an angular velocity detection value, a motor position detection value, or a motor speed detection value.

Here, it is assumed that a control point in a case when the central axis of the J1 shaft 102 and the central axis of the J6 shaft 107 are aligned is a singular point. The singular point is the position and the orientation of the control point in which the angles of the shafts are not set uniquely from the position and the orientation of the control point. For example, when the central axis of the J1 shaft 102 and the central axis of the J6 shaft 107 are aligned, the angles of the J1 shaft 102 and the J6 shaft 107 can be set to arbitrary values. When the hand 120, which is the control point, passes the vicinity of such a singular point, there is a case in which the shafts need to move abruptly. Specifically, the driving speed of the J1 shaft 102 obtained when the hand 120 passes along the track becomes faster as the track of the hand 120 becomes closer to the straight line passing through the central axis of the J1 shaft 102 and the movements of the other shafts (some or all of the J2 shaft 103, the J3 shaft 104, the J4 shaft 105, the J5 shaft 106, and the J6 shaft 107) are abruptly changed in order to maintain the position and the orientation of the hand 120. Even when the hand 120 moves on a linear track slowly, there is a case in which the position and the orientation of each arm member change quickly during the movement of the hand 120 due to the large movement of the J1 shaft.

Hereinafter, it is assumed that a position also includes an orientation unless otherwise particularly specified.

A compact operation mode and a normal mode are defined as descriptions that can be used in the robot program 207. The normal mode indicates a mode of linearly moving the hand 120 from a start position to an end position and the compact operation mode indicates a mode of moving the hand 120 from the start position to the end position such that the movement of the robot 100 is reduced compared to the normal mode. The processing unit calculates a track that is different depending on whether the moving instruction written in the robot program 207 is a mode of moving the hand 120 in the normal mode or a mode of moving the hand 120 in the compact operation mode.

Figure 4:
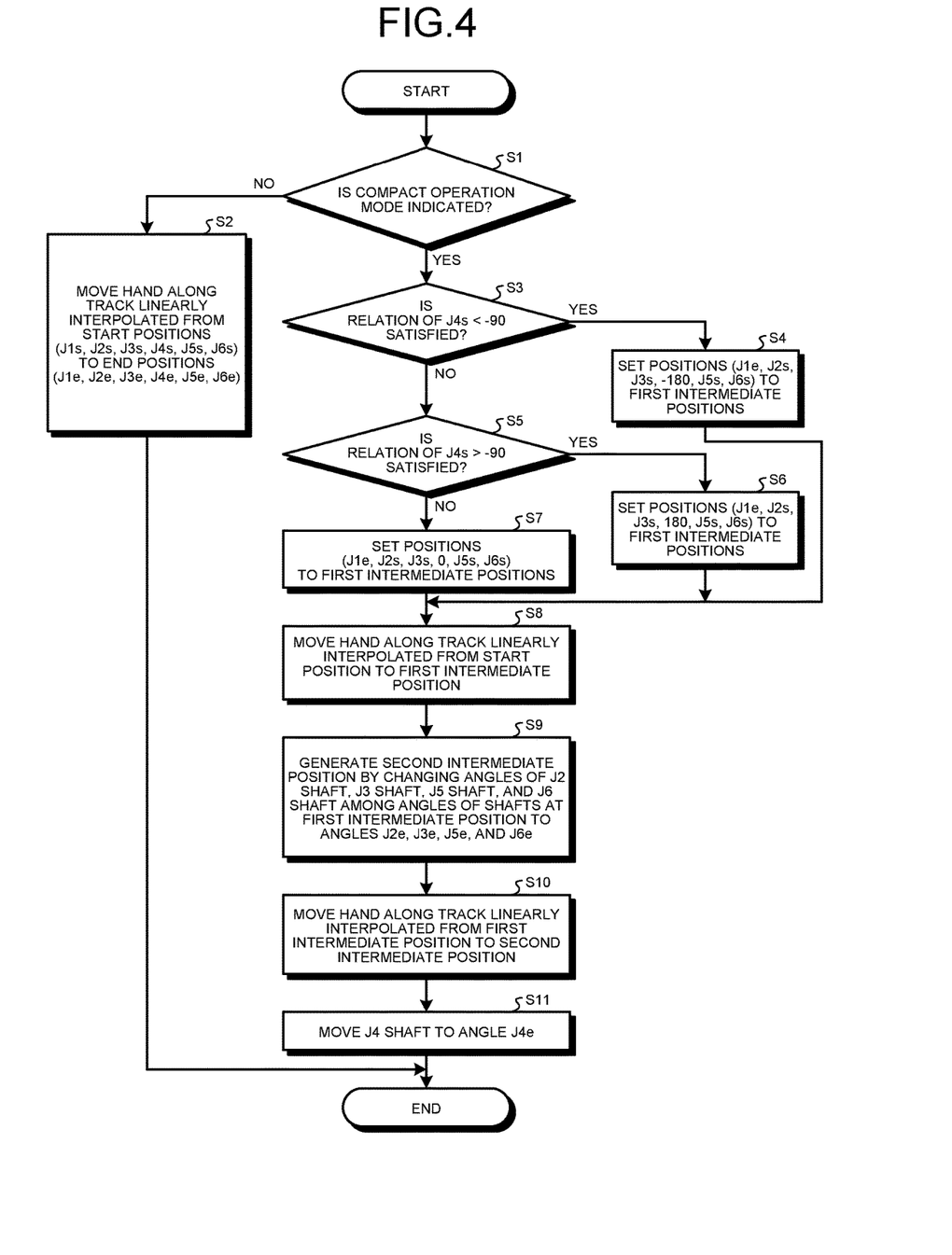
FIG. 4 is a flowchart illustrating an operation of the robot control device of the embodiment.

FIG. 4 is a flowchart illustrating an operation of the robot control device 200 of the embodiment.

When the processing unit analyzes the moving instruction for the hand 120 from the robot program 207, it is determined whether the compact operation mode is indicated as the mode of the moving instruction (S1). When the compact operation mode is not indicated (S1, No), i.e., the normal mode is indicated, the processing unit moves the hand 120 along the track linearly interpolated from the start position to the end position (S2) and ends the operation according to the moving instruction.

The moving designation based on the robot program 207 includes at least the designation of the target position of the hand 120. The processing unit sets a position obtained before the moving instruction is performed as the start position and sets the target position designated by the moving instruction as the end position. That is, according to this example, the processing unit acquires the target position from the robot program 207.

In the process of S2, the processing unit calculates an angle of each shaft at the end position on the basis of the orientation of the hand 120 and the coordinates at the end position. The angle of each shaft at the end position will be marked as elements (J1e, J2e, J3e, J4e, J5e, and J6e). The elements of the sequence respectively indicate the angle of the J1 shaft 102, the angle of the J2 shaft 103, the angle of the J3 shaft 104, the angle of the J4 shaft 105, the angle of the J5 shaft 106, and the angle of the J6 shaft 107 from the front side. Further, the unit of the angle will be set as a "° (deg)". The elements (J1s, J2s, J3s, J4s, J5s, and J6s) correspond to the angles of the shafts at the start position. Which element indicates an angle of which shaft is determined in a similar manner to the angle of each shaft at the end position. As the angle of each shaft at the start position, an angle calculated in advance on the basis of the target position of the immediately former moving instruction is used. Further, when the angle detection value can be acquired as the encoder value, the encoder value can be used as the angle of each shaft at the start position. Further, when a value other than the angle detection value can be acquired as the encoder value, the angle of each shaft can be calculated at the start position from the encoder value.

In S2, the processing unit performs an interpolation such that the position of the hand 120 moves linearly from the start position (J1s, J2s, J3s, J4s, J5s, or J6s) to the end position (J1e, J2e, J3e, J4e, J5e, or J6e). The interpolation interval is equal to, for example, the interval in which the driving instruction is supplied to the robot 100. The processing unit generates a driving instruction for every position generated by the interpolation and sequentially supplies the generated driving instruction to the robot 100.

Figure 5:
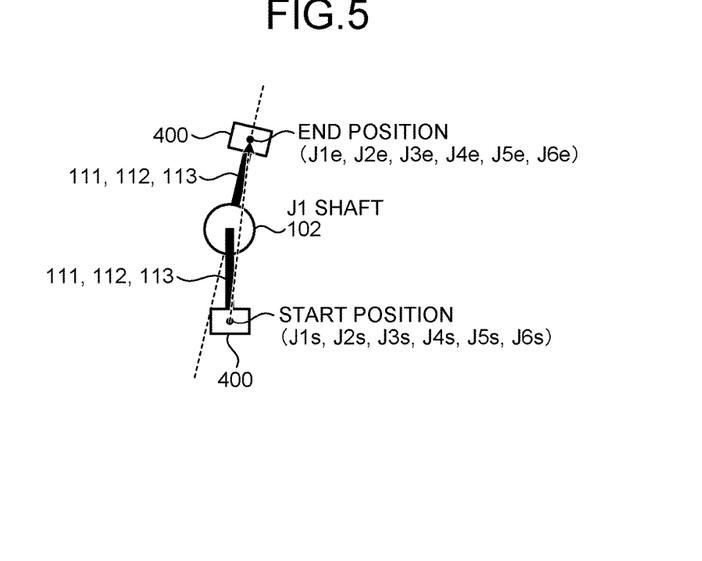
FIG. 5 is a diagram illustrating an example of a positional relation between a start position and an end position.

FIG. 5 is a diagram illustrating a positional relation between the start position and the end position. This diagram illustrates the state of the robot 100 when the robot 100 is viewed from above looking down in the direction of the central axis of the J1 shaft 102. It appears that the arm member 111, the arm member 112, and the arm member 113 are aligned when the robot 100 is viewed from above. Further, according to the example of the drawing, a workpiece 400 is gripped by the hand 120. Then, the angle difference of the J1 shaft 102 between the start position and the end position is slightly different from 180° (deg). According to the process of S2, the hand 120 (and the workpiece 400) can be moved linearly from the start position to the end position as indicated by the dotted arrow of FIG. 5. According to this track, the hand 120 passes through the vicinity of the singular point. When the hand 120 passes through the vicinity of the singular point, the position of the hand 120 is controlled while the orientation thereof is controlled. For this reason, the positions and the orientations of the arm member 111, the arm member 112, and the arm member 113 change quickly in accordance with the moving speed of the hand 120.

When the compact operation mode is indicated (S1, Yes), the processing unit generates two relay points (a first intermediate position and a second intermediate position) through which the hand 120 passes in order to reduce the movement of the robot 100 when compared with the process of S2.

Specifically, the processing unit first determines whether the angle J4s of the J4 shaft 105 at the start position is smaller than −90° (S3). When the angle J4s of the J4 shaft 105 is smaller than −90° (S3, Yes), the processing unit sets the positions (J1e, J2s, J3s, −180, J5s, and J6s) as the first intermediate positions (S4). When the angle J4s of the J4 shaft 105 at the start position is larger than −90° (S3, No), the processing unit further determines whether the angle J4s of the J4 shaft 105 at the start position is larger than 90° (S5). When the angle J4s of the J4 shaft 105 is larger than 90° (S5, Yes), the processing unit sets the positions (J1e, J2s, J3s, 180, J5s, and J6s) as the first intermediate positions (S6). When the angle J4s of the J4 shaft 105 is smaller than 90° (S5, No), the processing unit sets the positions (J1e, J2s, J3s, 0, J5s, and J6s) as the first intermediate positions (S7).

After the process of S4, S6, or S7, the processing unit moves the hand 120 along the track in which the distance from the start position to the first intermediate position is interpolated linearly (S8).

The process of S8 includes a first control of driving the J1 shaft 102 to the angle J1e of the J1 shaft 102 at the target position. Further, the process of S8 includes a second control of driving the J4 shaft 105 from the angle J4s to 0°, 180°, or −180°.

As described above, the J2 shaft 103, the J3 shaft 104, and the J5 shaft 106 are all bending/stretching shafts and the central axis of the J2 shaft 103 and the central axis of the J3 shaft 104 are parallel to each other. The J4 shaft 105, which is the turning shaft, is interposed between the J3 shaft 104 and the J5 shaft 106. However, when the J4 shaft 105 is driven to 0°, 180°, or −180°, the central axis of the J2 shaft 103, the central axis of the J3 shaft 104, and the central axis of the J5 shaft 106 are parallel to one another.

Further, the angle of the J4 shaft 105 at the first intermediate position can be arbitrarily set as long as the central axis of the J2 shaft 103, the central axis of the J3 shaft 104, and the central axis of the J5 shaft 106 can be set to be parallel to one another.

Further, the process of S8 is a process of performing the first control and the second control at the same time, but the first control and the second control may be performed separately instead of as the process of S8. Whichever of the first control and the second control is performed first is completely arbitrary.

After the hand 120 is moved to the first intermediate position, the processing unit calculates the angles of the shafts at the second intermediate positions by changing the angles of the J2 shaft 103, the J3 shaft 104, the J5 shaft 106, and the J6 shaft 107 among the angles of the shafts at the first intermediate positions to the angles J2e, J3e, J5e, and J6e at the end positions (S9). Then, the processing unit moves the hand 120 along the track in which the distance from the first intermediate position to the second intermediate position is linearly interpolated (S10).

The process of S10 corresponds to a third control of driving all the bending/stretching shafts (i.e., the J2 shaft 103, the J3 shaft 104, and the J5 shaft 106) to the angles J2e, J3e, and J5e at the target positions of the shafts without driving the J4 shaft 105 as the turning shaft driven by the second control. Further, herein, a case is described in which the J6 shaft 107 is driven in the process of S10, but the J6 shaft 107 may not be driven by the process of S10 if the J6 shaft 107 is driven to the angle J6e by the former and latter processes. The bending/stretching shafts are driven while the central axes of the bending/stretching shafts are kept such that they are parallel to one another by the third control.

Subsequently after the process of S10, the processing unit drives the J4 shaft 105 until the angle of the J4 shaft 105 matches the angle J4e of the J4 shaft 105 at the end position (S11) and then ends the operation according to the moving instruction. The process of S11 corresponds to a fourth control of driving the J4 shaft 105 that is not driven to the angle of the target position to the angle J4e of the target position. The J6 shaft 107 may be driven by the fourth control.

Figure 6:
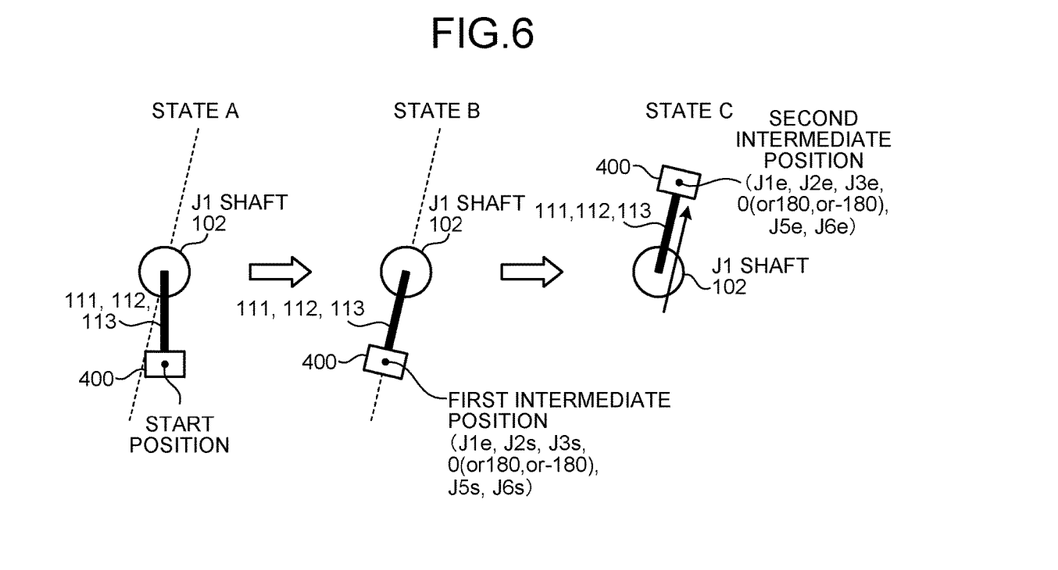
FIG. 6 is a diagram illustrating a track in a compact operation mode.
Figure 7:
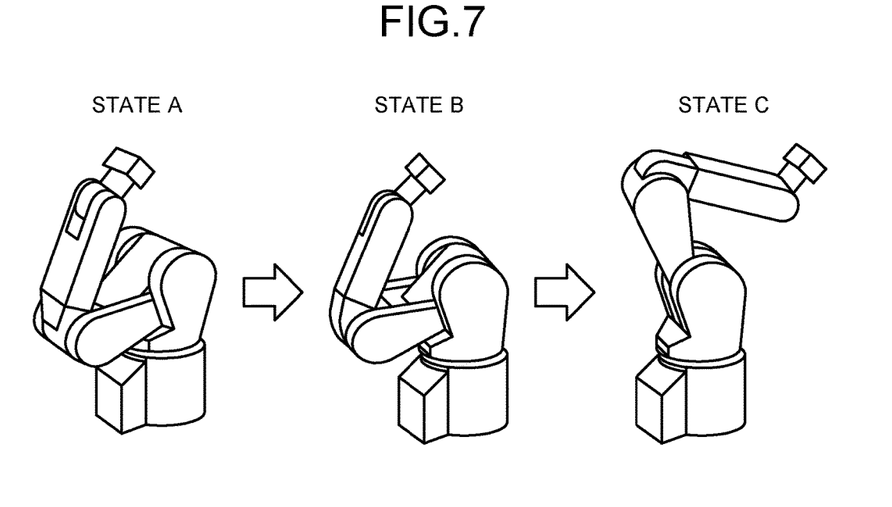
FIG. 7 is a diagram illustrating a track in a compact operation mode.

FIGS. 6 and 7 are diagrams illustrating a track in the compact operation mode. A state A indicates a state where the hand 120 is located at the start position. A state B indicates a state where the hand 120 is located at the first intermediate position. A state C indicates a state where the hand 120 is located at the second intermediate position.

The first intermediate position indicates a position that is generated by changing the angle of the J1 shaft 102 among the angles of the shafts at the start positions to the angle J1e of the J1 shaft 102 at the end position and changing the angle of the J4 shaft 105 to 0°, 180°, or −180°. As illustrated in the drawings, the hand 120 can be moved so as to pass through a point on the straight line passing through the central axis of the J1 shaft 102 instead of the vicinity of the straight line passing through the central axis of the J1 shaft 102 because the hand also passes through the first intermediate position in which the angle of the J1 shaft 102 is changed to the angle J1e of the J1 shaft 102 at the end position.

Further, the moving distance in the movement from the first intermediate position to the second intermediate position is longer than the movement from the original position to the first intermediate position and the movement from the second intermediate position to the end position. When the hand 120 moves from the first intermediate position to the second intermediate position, the J4 shaft 105 is not driven and the J2 shaft 103, the J3 shaft 104, and the J5 shaft 106 are driven. Thus, when the hand 120 moves from the first intermediate position to the second intermediate position, if the robot 100 is viewed from above, the arm member 111, the arm member 112, and the arm member 113 are driven so as not to deviate from a straight line connecting the first intermediate position and the second intermediate position. Therefore, the movement of the robot 100 is reduced compared with the process of S2.

In such a manner, according to the embodiment, the processing unit performs the first to fourth controls below after acquiring the target position of the control point of the end of the robot 100. The first control is a control of driving the J1 shaft 102 to the angle J1e at the target position of the J1 shaft 102. The second control is a control of driving the J4 shaft 105 such that the central axes of the J2 shaft 103, the J3 shaft 104, and the J5 shaft 106, which are all bending/stretching shafts and among six shafts, are parallel to one another. The third control is a control of driving the J2 shaft 103, the J3 shaft 104, and the J5 shaft 106, which are all bending/stretching shafts, to the angles J2e, J3e, and J5e at the target positions of the shafts without driving the J4 shaft 105, which is the turning shaft driven by the second control. The fourth control is a control of driving a shaft not reaching the angle at the target position to the angle at the target position. In the fourth control, the J4 shaft 105 is driven. The J6 shaft 107 may be driven in the third control or the fourth control. Accordingly, if the robot 100 is viewed from above, the arm member 111, the arm member 112, and the arm member 113 are driven so as not to deviate from a straight line connecting the first intermediate position and the second intermediate position, the movement of the robot 100 can be reduced compared with a case in which the robot 100 is driven linearly from the start position to the end position.

Further, in the description above, a case has been described in which the robot 100 includes six shafts, i.e., the J1 shaft 102, the J2 shaft 103, the J3 shaft 104, the J4 shaft 105, the J5 shaft 106, and the J6 shaft 107 in the order they appear in this sentence from the installation bed 101, but the number of shafts of the robot 100 is not limited thereto. For example, when the robot 100 includes more turning shafts, some or all of the turning shafts among the shafts excluding the J1 shaft 102 are driven such that the central axes of all the bending/stretching shafts are parallel to one another in the second control. Then, when the turning shaft other than the J4 shaft 105 does not reach the angle at the target position before the fourth control is performed, the turning shaft is driven by the fourth control. Further, the selection of the turning shafts among six shafts is not limited to the example of the above-described 6-axis vertical articulated robot.

Further, a case has been described in which the processing unit acquires the target position from the robot program 207, but the processing unit may acquire the target position by calculation. For example, the processing unit may divide a path from a current position to a position (an instruction position) indicated by the moving instruction of the robot program 207 into a plurality of sections and calculate the target position for each section.

Further, for example, the processing unit may be operated in the normal mode when the distance from the track to the straight line passing through the central axis of the J1 shaft 102 is longer than a threshold value set in advance and the processing unit may be operated in the compact operation mode when the distance from the track to the straight line passing through the central axis of the J1 shaft 102 is shorter than the above-described threshold value. In this way, the modes may be switched automatically. For example, when the processing unit divides a path into the plurality of sections, the processing unit may determine a mode for each of the divided sections. Further, the threshold value for determining the mode may be changed in accordance with the moving speed indicated by the moving instruction. For example, when the moving speed is high, the threshold value for determining the mode becomes large. Further, when the compact operation mode is set, the processing unit may be operated in the compact operation mode only in a section closest to the straight line passing through the central axis of the J1 shaft 102 and may be operated in the normal mode in the other sections. Further, when the processing unit is operated in the compact operation mode in the divided sections, a track from the second intermediate position to a position indicated by the moving instruction may be calculated again after the control to the second intermediate position.

REFERENCE SIGNS LIST 1 manufacturing system, 100 robot, 101 installation bed, 102 J1 shaft, 103 J2 shaft, 104 J3 shaft, 105 J4 shaft, 106 J5 shaft, 107 J6 shaft, 110, 111, 112, 113 arm member, 120 hand, 200 robot control device, 201 calculator, 202 main memory, 203 non-volatile memory, 204 I/O interface, 205 bus, 206 firmware program, 207 robot program, 300 transmission path, 400 workpiece.

The invention claimed is:

1. A robot control device that controls a robot including a plurality of shafts including two or more first shafts turning connected structures and two or more second shafts bending or stretching connected structures, a J1 shaft provided closest to an installation bed among the plurality of shafts corresponding to the first shaft, the robot control device comprising:
 a storage unit that stores a robot program that describes a procedure of a movement of a control point of the robot; and
 a processing unit that acquires a target position of the control point from the robot program and performs:
 a first control of driving the J1 shaft to an angle of the connected structures at the target position of the J1 shaft;
 a second control of driving at least one of the first shafts among shafts excluding the J1 shaft from the plurality of shafts such that central axes of all of the second shafts among the plurality of shafts are parallel to one another;
 a third control of driving all of the second shafts among the plurality of shafts to an angle of the target position of the second shafts without driving the first shafts driven by the second control after the first control and the second control are performed; and
 a fourth control of driving a shaft not reaching the angle of the connected structures at the target position among the plurality of shafts to the angle of the connected structures at the target position after the third control is performed.

2. The robot control device according to claim 1, wherein the plurality of shafts correspond to six shafts including the J1 shaft, a J2 shaft, a J3 shaft, a J4 shaft, a J5 shaft, and a J6 shaft in ascending order starting from a position closest to the installation bed,
 the J4 shaft and the J6 shaft correspond to the first shafts,
 the J2 shaft, the J3 shaft, and the J5 shaft correspond to the second shafts, and
 the second control is a control for driving the J4 shaft.

3. A robot control method that causes a robot control device to control a robot including a plurality of shafts including two or more first shafts turning connected structures and two or more second shafts bending or stretching connected structures, a J1 shaft provided closest to an installation bed among the plurality of shafts corresponding to the first shaft, the robot control method comprising:
 an acquisition step of acquiring a target position of a control point of an end of the robot from the robot program that describes a procedure of a movement of the control point;
 a first control step of driving the J1 shaft to an angle of the connected structures at the target position of the J1 shaft;
 a second control step of driving at least one of the first shafts among shafts excluding the J1 shaft from the plurality of shafts such that central axes of all of the second shafts among the plurality of shafts are parallel to one another;
 a third control step of driving all of the second shafts among the plurality of shafts to an angle of the connected structures at the target position of the second shafts without driving the first shafts driven by the second control step after the first control step and the second control step are performed; and
 a fourth control step of driving a shaft not reaching the angle of the connected structures at the target position among the plurality of shafts to the angle of the connected structures at the target position after the third control step is performed.

4. The robot control method according to claim 3, wherein the plurality of shafts correspond to six shafts including the J1 shaft, a J2 shaft, a J3 shaft, a J4 shaft, a J5 shaft, and a J6 shaft in ascending order starting from a position closest to the installation bed,
 the J4 shaft and the J6 shaft correspond to the first shafts,
 the J2 shaft, the J3 shaft, and the J5 shaft correspond to the second shafts, and
 the second control step is a step of driving the J4 shaft.

* * * * *